United States Patent
Li et al.

(10) Patent No.: US 8,831,909 B2
(45) Date of Patent: Sep. 9, 2014

(54) STEP DETECTION AND STEP LENGTH ESTIMATION

(75) Inventors: Fan Li, Beijing (CN); Chunshui Zhao, Beijing (CN); Feng Zhao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 13/240,743

(22) Filed: Sep. 22, 2011

(65) Prior Publication Data

US 2013/0080255 A1    Mar. 28, 2013

(51) Int. Cl.
*G01C 22/00* (2006.01)
*G01R 23/00* (2006.01)
*G01C 21/16* (2006.01)
*G06F 19/00* (2011.01)

(52) U.S. Cl.
CPC ............ *G01C 22/006* (2013.01); *G01C 21/165* (2013.01); *G06F 19/00* (2013.01)
USPC ............ 702/160; 701/469; 701/500; 702/75; 702/97

(58) Field of Classification Search
CPC ..... G01C 22/006; G01C 21/165; G06F 19/00
USPC ............ 702/75, 97, 104, 141, 149, 150, 160; 701/220, 409, 410, 446, 469, 472, 500; 705/14.58
See application file for complete search history.

(56) References Cited

U.S. PATENT DOCUMENTS

| | | | |
|---|---|---|---|
| 7,640,134 B2 | 12/2009 | Park et al. | |
| 7,690,556 B1 | 4/2010 | Kahn et al. | |
| 8,180,591 B2 * | 5/2012 | Yuen et al. | 702/160 |
| 8,615,377 B1 * | 12/2013 | Yuen et al. | 702/160 |
| 2008/0077326 A1 * | 3/2008 | Funk et al. | 701/220 |
| 2008/0120062 A1 | 5/2008 | Lee et al. | |
| 2009/0043504 A1 | 2/2009 | Bandyopadhyay et al. | |
| 2009/0192708 A1 | 7/2009 | Yoo et al. | |
| 2010/0004860 A1 | 1/2010 | Chernoguz et al. | |
| 2010/0130229 A1 | 5/2010 | Sridhara et al. | |

OTHER PUBLICATIONS

Cho et al., "AutoGait: A Mobile Platform that Accurately Estimates the Distance Walked," IEEE International Conference on Pervasive Computing and Communications (PerCom), Mar. 29, 2010-Apr. 2, 2010, 9 pages.

Fang et al., "Design of a Wireless Assisted Pedestrian Dead Reckoning System—The Navmote Experience," Proceedings of IEEE Transactions on Instrumentation and Measurement, Dec. 6, 2005, retrieved at <<http://ieeexplore.ieee.org/stamp/stamp.jsp?tp=&arnumber=1542534>>, 17 pages.

(Continued)

*Primary Examiner* — John H Le
(74) *Attorney, Agent, or Firm* — Carole Boelitz; Micky Minhas

(57) ABSTRACT

Step detection and step length estimation techniques include detecting salient points in sensor data of one or more sensors. A step frequency is estimated based on a time interval between the detected salient points. A step length of the step may then be computed based on a nonlinear combination of the estimated step frequency and a function of the sensor data, and/or a step model. Alternatively, the step length of the step may be computed based on a combination of a nonlinear function of the estimated step frequency and a (linear or nonlinear) function of the sensor data, and/or a step model.

20 Claims, 5 Drawing Sheets

(56) References Cited

OTHER PUBLICATIONS

Kim et al., "A Step, Stride and Heading Determination for the Pedestrian Navigation System," Proceedings: Journal of Global Positioning Systems, Nov. 15, 2004, 7 pages.

Shin et al., "Adaptive Step Length Estimation Algorithm Using Low-Cost MEMS Inertial Sensors," Proceedings: SAS '07. IEEE Sensors Applications Symposium, Feb. 6-8, 2007, pp. 1-5.

Wang et al., "A Novel Pedestrian Dead Reckoning Algorithm Using Wearable EMG Sensors to Measure Walking Strides," Proceedings of Ubiquitous Positioning Indoor Navigation and Location Based Service (UPINLBS), 2010, pp. 1-8.

El-Sheimy et al., "Everywhere Navigation," Proceedings: Inside GNSS, Sep./Oct. 2011, retrieved at <<www.insidegnss.com/auto/sepoct11-EI%20Sheimy.pdf>>, pp. 74-82.

Evennou et al., "Advanced Integration of WiFi and Inertial Navigation Systems for Indoor Mobile Positioning," Proceeding EURASIP Journal on Applied Signal Processing, vol. 2006, Jan. 2006, retrieved at <<http://downloads.hindawi.com/journals/asp/2006/086706.pdf>>, pp. 1-11.

Le et al., "Indoor Navigation System for Handheld Devices," Proceedings Worcester Polytechnic Institute, Worcester, Oct. 22, 2009, retrieved at <<http://www.wpi.edu/Pubs/E-project/Available/E-project-102209-164024/unrestricted/Indoor_Navigation_System_for_Handheld_Devices.pdf>>, 198 pages.

Loctronix, "Accurate Indoor Positioning and Navigation at the Threshold," retrieved on Decmeber 28, 2011 at http://www.loctronix.com/news/Insider/I1-A3-ScpDain.html>>, 3 pages.

Thiagarajan, "Probabilistic Models for Mobile Phone Trajectory Estimation," Sep. 2011, retrieved at <<http://nms.csail.mit.edu/papers/ArvindT.thesis.pdf>>, pp. 1-161.

Xiao et al., "Integrated Wi-Fi Fingerprinting and Inertial Sensing for Indoor Positioning," Proceedings: 2011 International Conference on Indoor Positioning and Indoor Navigation (IPIN), Sep. 21-23, 2011, retrieved at <<http://ipin2011.dsi.uminho.pt/PDFs/Shortpaper/112_Short_Paper.pdf>>, 4 pages.

\* cited by examiner

STEP DETECTION AND STEP LENGTH ESTIMATION

BACKGROUND

Step detection and step length estimation have recently received increased attention. One reason for this increased attention is the emergence of a pedestrian navigation system (PNS). Parallel to a global navigation system (GPS) for vehicle navigation, the pedestrian navigation system provides navigation instructions to a user for navigating around an area, such as an office building or shopping mall.

A number of models and technologies have been proposed and developed for pedestrian navigation. However, because the technologies are still in their infancy and because the accuracy of current step detection and step length estimation techniques is limited, these models and technologies are still far short of providing a useful navigation system for users.

SUMMARY

This summary introduces simplified concepts of adaptive step detection and step length estimation, which is further described below in the Detailed Description. This summary is not intended to identify essential features of the claimed subject matter, nor is it intended for use in limiting the scope of the claimed subject matter.

This application describes example embodiments of adaptive step detection and step length estimation. In one embodiment, sensor data may be received from a sensor such as, for example, an accelerometer, a pedometer, a gyroscope, a compass, etc. Salient points of a same type (such as valleys of a trajectory of magnitudes of the sensor data, or peaks of a trajectory of magnitudes of sensor data) may be detected in the sensor data. Based on a time interval between the detected salient points in the sensor data, a step frequency may be estimated. In some embodiments, a step length of a step may be determined based at least on a nonlinear combination of the estimated step frequency and a function of the sensor data obtained within the time interval. Additionally or alternatively, the step length of the step may be determined based at least on a combination of a nonlinear function of the estimated step frequency and a function of the obtained sensor data.

In another embodiment, an area of interest in which a user intends to navigate may be determined. In response to determining the area of interest, a map that covers at least a portion of the determined area of interest may be obtained. Additionally, a location of the user on the obtained map may be determined based on a detection of a plurality of steps the user has made and an estimation of respective step lengths of the plurality of steps.

In some embodiments, a map may be displayed to a user. The map may represent a predetermined scope of an area that covers a current location of the user. The user may provide an indication of a destination location on the displayed map. In response to receiving the indication of the destination location, live "turn-by-turn" instructions may be provided to the user to route the user to the destination location. In one embodiment, the live instructions may be provided to route the user to the destination location based on local sensor data, and without using a Global Positioning System (GPS). Furthermore, a new location of the user may be determined based on a detection of a plurality of steps and an estimation of respective step lengths of the plurality of steps made by the user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
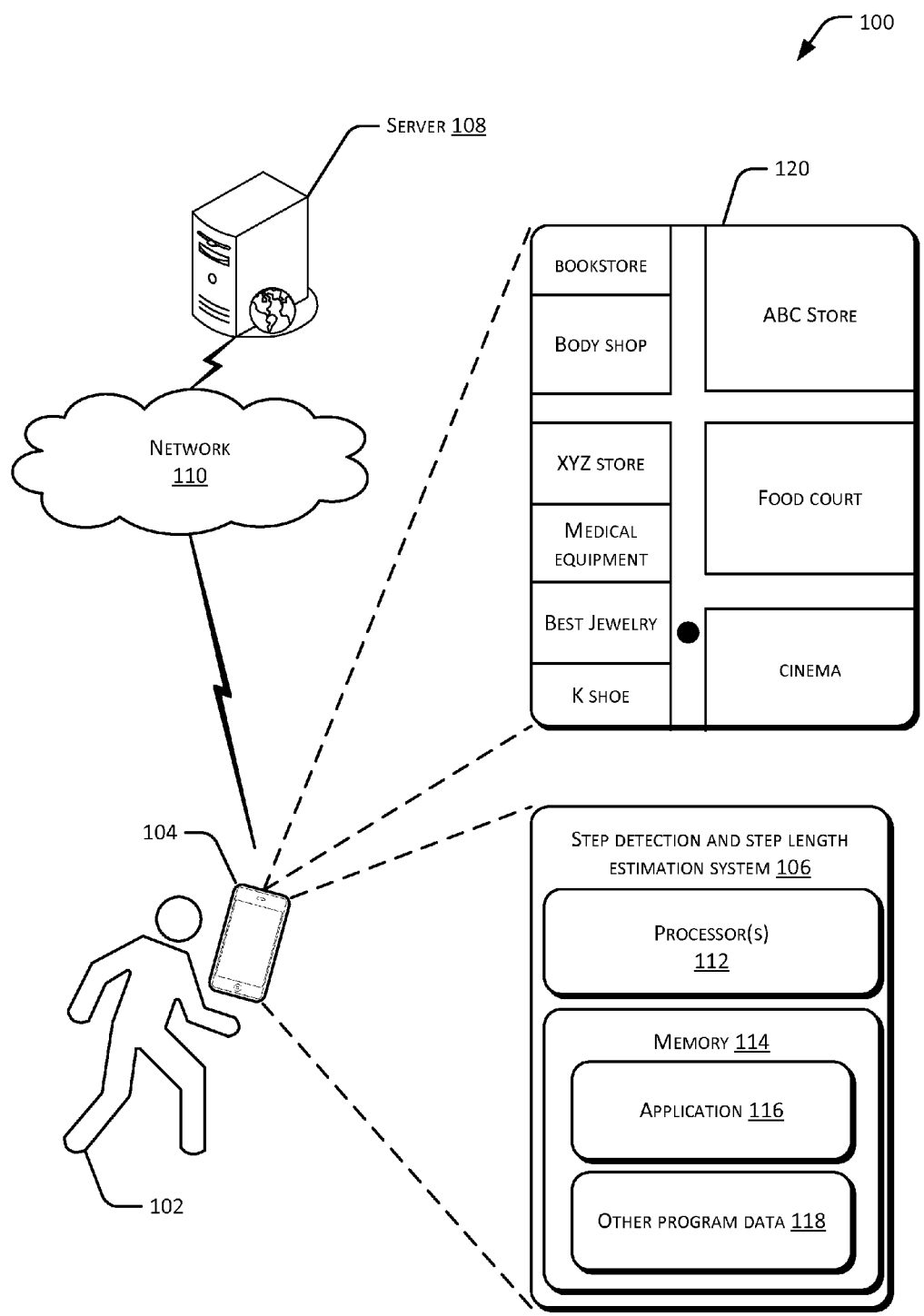
FIG. 1 illustrates an example environment including an example step detection and step length estimation system.

As noted above, existing technologies fail to accurately and adaptively detect steps and estimate respective step lengths.

This disclosure describes a step detection and step length estimation system, which accurately and adaptively detects a step and estimates corresponding step length of the step.

Generally, a user may have a client device that includes all or part of the step detection and step length estimation system. The user may or may not be in direct physical contact with the client device. By way of example and not limitation, the user may, for example, hold the client device in his/her hand, fasten the client device to his/her body such as a hand, arm, leg or waist, carry the client device in a bag or holder, or put the client device in a pocket of the user.

In one embodiment, as the user moves (e.g., walks, runs or jogs, moves up or down, etc.) about an area, the step detection and step length estimation system detects the movement of the user using one or more sensors of the client device. The one or more sensors may include, but are not limited to, an accelerometer, a pedometer, a digital compass, a gyroscope, a network signal detector (e.g., WiFi network interface card), etc.

The step detection and step length estimation system may determine whether a step has been made or completed by the user based on sensor data of a subset or all of the one or more sensors. In one embodiment, the step detection and step length estimation system may determine that a step has been made by the user by detecting salient points in the sensor data of at least one of the one or more sensors. The salient points may include, for example, zero crossing points, valleys of a magnitude trajectory of sensor data, peaks of a magnitude trajectory of sensor data, etc.

In response to detecting a step, the step detection and step length estimation system may estimate corresponding step length of the step. In one embodiment, the step detection and step length estimation system may estimate the step length of the step based on a step model. The system may automatically select the step model from a plurality of step models. By way of example and not limitation, the system may select the step model based on personal information of the user. Examples of personal information of the user may include, but are not limited to, an age, a height, a weight, a gender, etc. Additionally or alternatively, the system may select the step model from the plurality of step models based on a type of movement of the user. The type of movement of the user may include, for example, walking, jogging, running, moving up, moving down, etc.

Additionally or alternatively, the system may select the step model from the model from the plurality of step models based on positions of the one or more sensors and/or a position of the client device. The positions of the one or more sensors and/or the position of the client device may include, for example, a position close to a body part of the user (such as fastened to or held by a hand, an arm, a waist, etc.), a pocket of the user's clothes, a bag, etc.

Additionally or alternatively, the system may select the step model from the plurality of step models based on a type of shoes that the user wears. Additionally or alternatively, the system may select the step model from the plurality of step models based on a type of surface on which the user moves. Examples of the type of surface may include, but are not limited to, grass, concrete, wood, sand, etc.

Furthermore, the system may select a step model from the plurality of step models and display the selected step model to the user. The user may be allowed to confirm, reject or change the step model which is then inputted back to the system. In one or more of the foregoing ways, the system may employ a step model that most closely approximates a step of the particular user.

In an alternative embodiment, rather than having a plurality of step models for selection, the system may include a single generic step model. The system may estimate the step length of the step using this single generic step model. Additionally or alternatively, the system may adaptively select or adjust parameters of this generic step model (or one of the step models described in the previous paragraph) to customize the step model for the user. For example, the generic step model may include a plurality of predefined values for a selectable or adjustable parameter of the model. The system may adaptively select or adjust the value of this selectable or adjustable parameter of the model based on the actual movement (e.g., the type of the movement) and/or characteristics (e.g., the age, the gender, the height, etc.) of the user. In some embodiments, the customization may be performed iteratively or continuously over time, such that the step model may improve (i.e., more closely match the user's steps) over time with continued use.

In response to selecting the step model and/or adaptively adjusting the parameters of the generic step model, the system may estimate the step length of the user's steps using the step model. In one embodiment, the step model may include a relationship between the step length of the step and the detected salient points of the sensor data. In some embodiments, the system may estimate the step length of the step using the step model without location information of the user and/or any reference position at any time before, during and after the step. In some alternative embodiments, the system may receive location information of the user and/or one or more reference positions at some time before, during and/or after the step. In these alternative embodiments, the system may estimate the step length of the step based on the step model and the location information of the user and/or the one or more reference positions. For example, when location information is received from an external service (e.g., a GPS system), the system may use the received location information to customize or refine the step model, to correct for error in the user's location on a map, or for other purposes.

In some embodiments, the system may select a new step model based on a detected change in the type of movement of the user. The system may estimate step lengths of any future steps based on the new step model. Additionally, the system may re-estimate step lengths for a predetermined number of previous steps or time prior to selecting this new step model. The system re-estimates previous step lengths to compensate or correct possible errors due to a time lag between the time of which the type of movement of the user actually changes and the time of which the change in the type of movement of the user is detected or the new step model is selected.

The described system detects steps and determines respective step lengths of the steps accurately and adaptively. By incorporating with data of other sensors such as a digital compass, the described system may provide navigation instructions to a user to navigate an area that is unfamiliar to the user.

While in the examples described herein, the step detection and step length estimation system detects a step, selects a step model, and estimates corresponding step length of the step based on the selected step model, in other embodiments, these functions may be performed by multiple separate systems or services. For example, in one embodiment, a detection service may detect the step, while a separate service may select the step model based on personal information of the user and/or the type of movement of the user, and yet another service may estimate the step length of the step.

The application describes multiple and varied implementations and embodiments. The following section describes an example environment that is suitable for practicing various implementations. Next, the application describes example systems, devices, and processes for implementing a step detection and step length estimation system.

Exemplary Architecture

FIG. 1 illustrates an exemplary environment 100 usable to implement step detection and step length estimation. The environment 100 includes a user 102 and a client device 104. In one embodiment, the client device 104 may include a step detection and step length estimation system 106. In some embodiments, part or all of the step detection and step length estimation system 106 may be included in a server 108 that is separate from the client device 104. In that case, the client device 104 may communicate with the step detection and step length estimation system 106 through a network 110. In at least one alternative embodiment, functions of the step detection and step length estimation system 106 may be included and distributed among multiple devices. For example, the client device 104 may include part of the functions of the step detection and step length estimation system 106 while other functions of the step detection and step length estimation system 106 may be included in the server 108.

The client device 104 may be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

The network 110 may be a wireless or a wired network, or a combination thereof. The network 110 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. In one embodiment, the network 110 may include a near field communication channel. Examples of a near field communication channel include, but are not limited to, infrared communication, radio-frequency (RF), Bluetooth®, WiFi®, WiFi® connect, ZigBee®, infrared data association (IrDA), high-frequency modulated visible light and/or modulated audio.

In one embodiment, the client device 104 includes a processor 112 coupled to memory 114. The memory 114 includes one or more applications 116 (e.g., a step detection/step length estimation application, a navigation application, a map application, a web browser, etc.) and other program data 118. The memory 114 may be coupled to or associated with, and/or accessible to other devices, such as network servers, routers, and/or other client devices.

The user 102 may want to count the number of steps he/she will make and estimate respective step lengths (or the total distance) of the steps. The user 102 may open the application 116 (e.g., the step detection/step length estimation application) to perform such a task. Additionally or alternatively, the user 102 may open the application 116 (e.g., the navigation application or the map application) to display a map 120 to navigate an area such as a shopping mall, etc. In response to opening the application 116, the step detection and step length estimation system 106 is activated to detect steps made by the user 102 and estimate respective step lengths of the steps.

Figure 2:
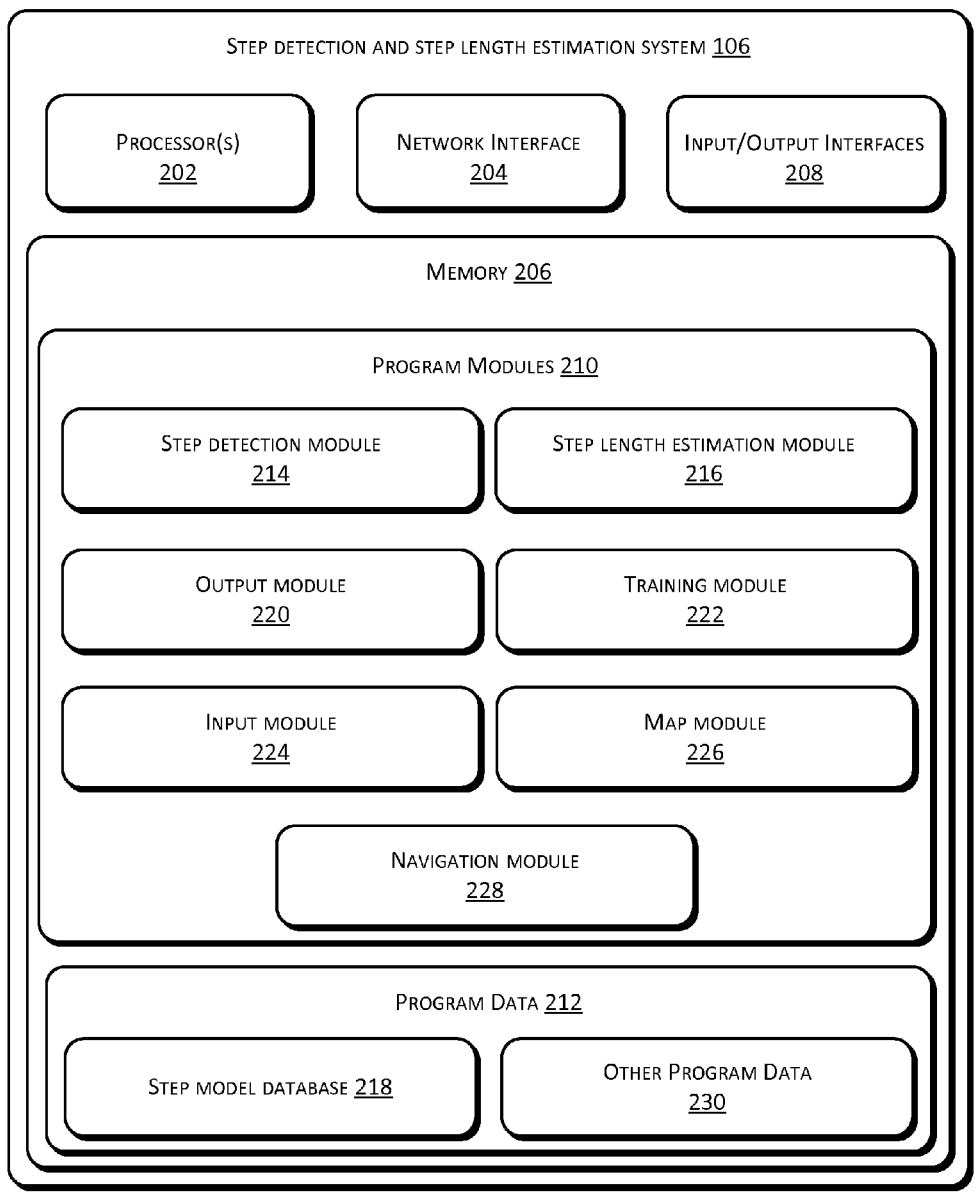
FIG. 2 illustrates the example step detection and step length estimation system of FIG. 1 in more detail.

FIG. 2 illustrates the step detection and step length estimation system 106 in more detail. In one embodiment, the step detection and step length estimation system 106 can include, but is not limited to, one or more processors 202, a network interface 204, memory 206, and an input/output interface 208. The processor 202 is configured to execute instructions received from the network interface 204, received from the input/output interface 208, and/or stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the step detection and step length estimation system 106 may include step detection module 214. The step detection module 214 is configured to detect or determine a step made by the user 102. By way of example and not limitation, the step detection module 214 may detect or determine the endpoints (e.g., the beginning and the end) of a step through one or more sensors of the client device 104. The one or more sensors obtain sensor data that represents movement of the user 102. In one embodiment, the one or more sensors may include, but are not limited to, an accelerometer, a pedometer, a digital compass, a gyroscope, a network signal detector, etc.

In response to receiving the sensor data (e.g., acceleration data from an accelerometer, etc.) representing the movement of the user 102, the step detection module 214 may analyze the sensor data to determine whether a step has been made or completed. In one embodiment, the step detection module 214 may filter the sensor data prior to analyzing the sensor data. The step detection module 214 may filter the sensor data using a low pass filter to reduce noise in the sensor data. By way of example and not limitation, the low pass filter may include, but is not limited to, a Finite Impulse Response (FIR) filter and/or a Biorthogonal Spline Wavelet (BSW) filter.

Regardless of whether filtering is applied to the sensor data, the step detection module 214 may detect or determine a step using a step detection algorithm. For example, the step detection algorithm may search for salient points of a magnitude trajectory of the sensor data (such as a trajectory of magnitudes of acceleration) to detect whether a new step has occurred. The salient points may include, for example, inflection points such as peaks or valleys of the trajectory, zero crossing points of the trajectory, etc.

In response to detecting the presence of a step, the step detection module 214 may compute a step frequency of the detected step. In one embodiment, the step detection module 214 may determine a time duration for the detected step based on a time interval between detected salient points in the sensor data. In response to determining the time duration for the detected step, the step detection module 214 may compute the step frequency of the detected step as a reciprocal of the determined time duration.

Additionally, the step detection module 214 may further apply one or more heuristic constraints to eliminate possible erroneous detection of a step and hence estimation of a step frequency. By way of example and not limitation, upon obtaining the time interval between the detected salient points (such as valleys of the magnitude trajectory of sensor data), the step detection module 214 may compare this time interval between the detected salient points to a first predetermined threshold (e.g., 0.05 seconds). This first predetermined threshold may be automatically or manually adjusted based on the type of movement and/or personal information of the user 102. In one embodiment, the first predetermined threshold may reflect a minimum time expected for completing a step by the user 102.

If this time interval is less than the first predetermined threshold, the step detection module 214 may determine that the time to complete a step is unrealistically too short and may therefore determine that one of the detected salient points may be an erroneous detection. For example, the step detection module 214 may designate a later of the two salient points as erroneous. The step detection module 214 may re-run the step detection algorithm and determine a new salient point that is located outside the time interval between the previously detected salient points, and estimate a new step frequency based on a new time interval obtained between the new salient point and one of the previously detected salient points (i.e., the salient point that is not deemed erroneous).

Additionally or alternatively, the step detection module 214 may compare the time interval between the detected salient points to a second predetermined threshold (e.g., 1 second). Similar to the first predetermined threshold, this second predetermined threshold may be automatically or manually adjusted based on the type of movement and/or personal information of the user 102. In one embodiment, the second predetermined threshold may reflect a maximum time expected for completing a step by the user 102.

In response to determining that the time interval between the detected salient points is greater than the second predetermined threshold, the step detection module 214 may determine that the time to complete a step is unrealistically too long and determine that one of the detected salient points may therefore be an erroneous detection. For example, the step detection module 214 may designate a later of the two salient points as erroneous. The step detection module 214 may re-run the step detection algorithm and determine a new salient point that is located within the time interval between the previously detected salient points, and estimate a new step frequency based on a new time interval obtained between the new salient point and one of the previously detected salient points (i.e., the salient point that is not deemed erroneous).

In some embodiments, the step detection module 214 may optionally analyze the sensor data that is within the detected time duration of the step. By way of example and not limitation, the step detection module 214 may find, for example, maximum and minimum magnitudes of the sensor data (such as maximum and minimum magnitudes of acceleration that are obtained from the acceleration data of an accelerometer, etc.) within the detected time duration of the step.

In response to determining the step frequency, the step detection and step length estimation system 106 may further include a step length estimation module 216 that estimates a step length of the detected step. In one embodiment, the step length estimation module 216 may employ a step model.

In some embodiments, the step length estimation module 216 may select the step model from a step model database 218 that is stored in the program data 212. In various embodiments, the step model database 218 may be stored in local memory of a client device, such as client device 104, and/or in memory of one or more remote servers, such as server 108. The step model database 218 may include a plurality of step models. The step length estimation module 216 may select a step model from the plurality of step models based on one or more factors. In one embodiment, the one or more factors may include, but are not limited to, personal information of the user 102. The personal information of the user 102 may include, for example, an age, a gender, a height and/or a weight of the user 102.

Additionally or alternatively, the one or more factors may include, for example, a current and/or historical type of movement of the user 102 detected by the step detection and step length estimation system 106. The type of movement may include, but is not limited to, walking, jogging, running, moving up or moving down.

Additionally or alternatively, the step length estimation module 216 may select the step model from the plurality of step models based on positions of the one or more sensors and/or a position of the client device 104. The positions of the one or more sensors and/or the position of the client device 104 may include, for example, a position substantially close to a body part of the user (such as fastened to or held by a hand, an arm, a waist, etc.), a pocket of the user's clothes, a bag, etc.

By way of example and not limitation, the system 106 or the step length estimation module 216 may determine the positions of the one or more sensors and/or the client device 104 based on the amount or degree of swing the one or more sensors and/or the client device 104 experience through an inertial sensor of the client device 104, for example. For example, the amount or degree of swing when the one or more sensors and/or the client device 104 are fastened to or held by the hand of the user 102 is expected to be greater than the amount or degree of swing when fastened to an arm of the user 102, which in turn may be greater than the amount or degree of swing when fastened to the waist or a holder fastened to the waist of the user 102 or in a pocket of the user 102. Based on the amount or degree of swing the one or more sensors and/or the client device 104 experience, the system 106 or the step length estimation module 216 may determine the positions of the one or more sensors and/or the position of the client device 104.

Additionally or alternatively, the system may select the step model from the plurality of step models based on a type of shoes that the user wears. Additionally or alternatively, the system may select the step model from the plurality of step models based on a type of the surface on which the user moves. Examples of the type of surface may include, but are not limited to, grass, concrete, wood, sand, etc.

In an alternative embodiment, the step model database 218 may include a single generic step model. The single generic step model may include a plurality of selectable or adjustable parameters. The step length estimation module 216 may adaptively select or adjust a value from a plurality of predefined values for each selectable or adjustable parameter based on the personal information and/or the type of movement of the user 102, for example.

In one embodiment, in response to selecting a step model or selecting or adjusting parameters of a generic model from the step model database 218, the step length estimation module 216 may estimate a step length of the detected step based at least on the selected step model. Additionally, the step length estimation module 216 may estimate the step length of the detected step based further on the determined step frequency (or the determined time duration) and/or the sensor data during the time duration of the detected step.

In one embodiment, the step length estimation module 216 may estimate the step length of the detected step based on a nonlinear combination of the determined step frequency and the sensor data. In another embodiment, the step length estimation module 216 may estimate the step length of the detected step based on a combination of a nonlinear function of the determined step frequency and a (linear or nonlinear) function of the sensor data. These step models allow a better or closer real-world modeling of a step length of a step made by the user 102.

By way of example and not limitation, the step model may, for example, be a function of the determined step frequency (or determined time duration) and the determined maximum and minimum magnitudes of the sensor data during the time duration of the detected step. In some embodiments, the step model may be a function of the determined step frequency (or determined time duration) and a difference between the determined maximum and minimum magnitudes of the sensor data during the time duration of the detected step.

In one embodiment, the step detection and step length estimation system 106 (e.g., the step detection module 214) may determine the type of movement based on the step frequency of the step. For example, the step frequency for running is normally higher than that for walking. Based on the estimated step frequency (and possibly information of the user 102 such as height, weight, age, gender, etc.), the step detection module 214 may develop a relationship between each type of movement and corresponding step frequency range, for example.

Additionally or alternatively, the step detection and step length estimation system 106 (or the step length estimation module 216) may determine the type of movement of the user 102 based on the estimated step length. For example, the step length for walking is usually shorter than the step length for running. Based on the estimated step length of a step, the step length estimation module 216 may develop a relationship between each type of movement and corresponding step length range.

Additionally or alternatively, the system 106 may determine the type of movement of the user 102 based on the estimated step frequency and the estimated step length. The system 106 may develop a relationship (such as a function or table) of each type of movement with a step frequency range and a step length range. Additionally or alternatively, the system 106 may first use an estimated step frequency to select or determine the type of movement of the user 102 and hence a step model for the user 102. The system 106 may then revise or confirm the step model based on a step length estimated using the selected or determined step model. For example, the system 106 may first determine that the type of movement of the user 102 is running based on the estimated step frequency and hence select a step model based on the determined type of movement. The system 106 may, however, find that the step lengths subsequently estimated by the system 106 or the step model are close to or outside the lower bound of the step length range for running. The system 106 may then determine that the type of movement may be jogging instead and update the step model according to the new determined type of movement (i.e., jogging), for example.

In some embodiments, the step detection and step length estimation system 106 may further include an output module 220. The output module 220 may provide information of the determined step frequency (or the determined time duration) of the step and/or the estimated step length of the step to the client device 104 for display to the user 102. Additionally or alternatively, the output module 220 may provide the total number of steps and the distance the user 102 has made since the activation of the step detection and step length estimation system 106 in the current session to the client device 104 for display to the user 102.

In one embodiment, the step detection and step length estimation system 106 may further include a training module 222. The training module 222 may allow the system 106 to customize a step model to the user 102. For example, the training module 222 may request that the user 102 walk, jog or run along two locations, the distance between the two locations being known by the system 106. The system 106 may know the distance based on a map or a floor plan including the two locations. Alternatively, the system 106 may receive an estimated or actual distance provided by the user 102 through an input module 224. The system 106 may use this estimated or actual distance provided by the user 102 as a reference. In yet another alternative, the system may determine an actual distance based on GPS data, if available. Upon completion of walking, jogging or running between the two locations, the user 102 may be allowed to enter the number of steps he/she has made, which may be received by the system 106 through the input module 224. Additionally or alternatively, the system 106 may detect or estimate the number of steps that the user 102 has made based on the step detection algorithm as described in the foregoing embodiments. The training module 222 may then train a new step model based on this information. Additionally or alternatively, the training module 22 may use this information to refine an existing step model used by the system 106 for the user 102. The existing step model may have been selected by the system 106 or the user 102 based on the personal information and/or the type of movement of the user 102.

Alternative Embodiments

In one embodiment, the step detection and step length estimation system 106 may further include a map module 226. The map module 226 may provide a map to the client device 104 for display to the user 102. In one embodiment, the map may cover an area that is local to a current position of the user 102. The map may include, but is not limited to, a street map, a floor plan map of a building, etc. The map module 226 may obtain the map from the Internet (e.g., Bing maps). Additionally or alternatively, the map module 226 may obtain the map from one or more map stations local to the current position of the user 102 (e.g., a kiosk, a hotspot, a RFID tag, a broadcast beacon, etc.).

For example, the user 102 may walk inside a building or walk along a street. Prior to or while walking inside the building or along the street, a map station (which may be supported by a management group of the building, a store owner on the street, a visitor information service, or a location service, for example) may send out an indication of a map to the system 106 or the client device 104 automatically or upon request by the user 102. The system 106 or the client device 104 may download the map to the system 106 of the client device 104 upon consent from the user 102.

In response to obtaining the map, the step detection and step length estimation system 106 may further provide an updated position of the user 102 on the obtained map based on the detected number of steps and respective estimated step lengths of the detected steps. In one embodiment, the step detection and step length estimation system 106 may further provide a navigation module 228 that provides navigation instructions (e.g., live turn-by-turn directions) to the client device 104 for display to the user 102. The navigation module 228 may further provide information of points of interest (e.g., shopping mall, store, restaurant, etc.) and/or points of reference (e.g., landmarks, signs, etc.) to the client device 104 for display to the user 102.

For example, the user 102 may indicate an area of interest in which the user 102 intends to navigate to the navigation module 228. Additionally or alternatively, the navigation module 228 may determine or predict the area of interest by determining a direction the user 102 is heading to, for example, based on information of a digital compass or a gyroscope of the client device 104. In response to determining or receiving information of the area of interest from the user 102, the navigation module 228 may obtain a map that covers at least a portion of the determined or received area of interest for the user 102. The navigation module 228 may provide this obtained map to the client device 104 for display to the user 102. Alternatively, the navigation module 228 may provide a map representing a predetermined scope of an area that covers a current location of the user 102 to the client device 104 for display to the user 102.

Furthermore, the navigation module 228 may continuously or regularly (such as after a predetermined number of detected steps and/or time interval which is set by the system 106 or the user 102, for example) determine a new location of the user 102 in the obtained map based on the detection of a plurality of steps (as determined by the step detection module 214) and an estimation of respective step lengths of the plurality of steps (as estimated by the step length estimation module 216). In some embodiments, the navigation module 228 may further provide instructions to the user 102 to route the user 102 to a destination (that is indicated by the user 102, for example) with or without the help of GPS data.

Additionally, the navigation module 228 may further provide one or more recommendations to the user 102 based on the determined location of the user 102. Additionally or alternatively, the navigation module 228 may provide the one or more recommendations to the user 102 based on personal information of the user 102 that the user 102 has provided to the system 106 or the client device 104. The user 102 may, however, be allowed to opt out of providing any personal information or any personally identifiable information to the system 106 or the client device 104.

In one embodiment, the one or more recommendations may include, but are not limited to, information of points of interest, advertisements and/or coupons related to the determined location of the user 102 (e.g., advertisements or coupons provided by stores that are close to the determined location). In some embodiments, the navigation module 228 may provide the one or more recommendations (such as coupons) to the user 102 in exchange for the user 102 to provide a subset of personal information of the user 102. Examples of the subset of personal information of the user 102 may include, but are not limited to, interests of the user 102 such as favorite music, favorite brand, age, gender, etc.

In some embodiments, the navigation module 228 may determine the current location of the user 102 with or without using any Global Positioning System (GPS) data. For example, the user 102 may walk around in an indoor area such as a building with little or no signal of GPS data. The navigation module 228 may then determine the current location of the user 102 based on the detection of steps and estimation of step lengths through a step model of the system 106.

Additionally or alternatively, the navigation module 228 may further receive location information from one or more computing devices around the location of the user 102. The computing devices may include, for example, devices (e.g., WiFi hotspots, radio frequency beacons, etc.) that are installed in reference positions or buildings (such as stores) to broadcast their locations for facilitating determination of the current location of the user 102 by the system 106 or for other reasons. Additionally or alternatively, the navigation module 228 may determine the current location of the user 102 through algorithms such as surveying and/or triangulation of wireless networks (such as the network 110) around the user 102.

In one embodiment, the system 106 may update the step model currently used by the system 106 in response to determining that a difference between information of the location determined by the system 106 and the location information received or determined from other one or more computing devices around the user 102 is greater than a predetermined threshold.

Although the foregoing embodiments describe detecting steps and estimating step lengths of the steps using sensor data of a sensor, the system 106 may employ multiple sensors for step detection and step length estimation. In one embodiment, the system 106 may include at least one step model for estimating a step length of a step based on each sensor. In some embodiments, the system may include an integrated step model that is a function of sensor data from multiple sensors. Additionally or alternatively, the system 106 may include a step model that is a function (e.g., a linear or non-linear combination) of a step frequency or a time interval between steps, sensor data between the time interval, and/or a change in direction of movement. For example, when the user 102 makes a turn, the step length or size is usually smaller compared with the step length or size when the user 102 is moving forward. Taking into account of the change in direction of movement (as detected by a digital compass or accelerometer, for example) may allow the step model used by the system 106 to closely reflect the actual situation of the movement of the user 102.

In one embodiment, the system 106 may further include other program data 230, such as log data of the previous steps detected and step lengths estimated by the system 106. The system 106 may use this log data to train or refine the one or more step models used by the system 106. In some embodiments, the system 106 may further send this log data and possibly personal information (such as a gender, an age, a weight and/or a height) of the user 102 to a server (e.g., the server 108) for training step models in the servers upon consent of the user 102.

Additionally or alternatively, in some embodiments, the system 106 may store the step model(s) and/or the parameters of the step model(s) in the client device 104 and/or in a cloud (e.g., the server 108). Additionally or alternatively, the system 106 may perform computation of the step detection and the step length estimation on the client device 104 and/or the cloud, depending on one or more factors or requirements. The one or more factors or requirements may include, but are not limited to, a tolerable application response latency specified by the user 102, a bandwidth or transmission speed of a communication network (e.g., the network 110) between the client device 104 and the cloud (e.g., the server 108), and/or a device capability of the client device 104 (such as battery reserve, etc.) or the server 108.

Additionally or alternatively, the system 106 may change the computation of the step detection and/or the step length estimation from a location to another location automatically or upon request from the user 102 based on a change in the above one or more factors, for example. By way of example and not limitation, the system 106 may initially perform computation of the step detection and/or the step length estimation in the cloud (e.g., in the server 108). The system 106 may detect a decrease in the bandwidth and/or the transmission speed of the network 110 between the client device 104 and the server 108. In response to detecting the decrease in the bandwidth and/or the transmission speed of the network 110, the system 106 may change the location on which future computation of the step detection and/or step length estimation from the server 108 to the client device 104 in order to reduce the response latency of the computation. Additionally or alternatively, the system 106 may change the location of the step detection and/or step length estimation computation back to the server 108 in response to determining or detecting that the bandwidth and/or the transmission speed of the network 110 increases to a predetermined level or a predetermined level for a predetermined period of time, for example.

Example Step Data Collection

Figure 3:
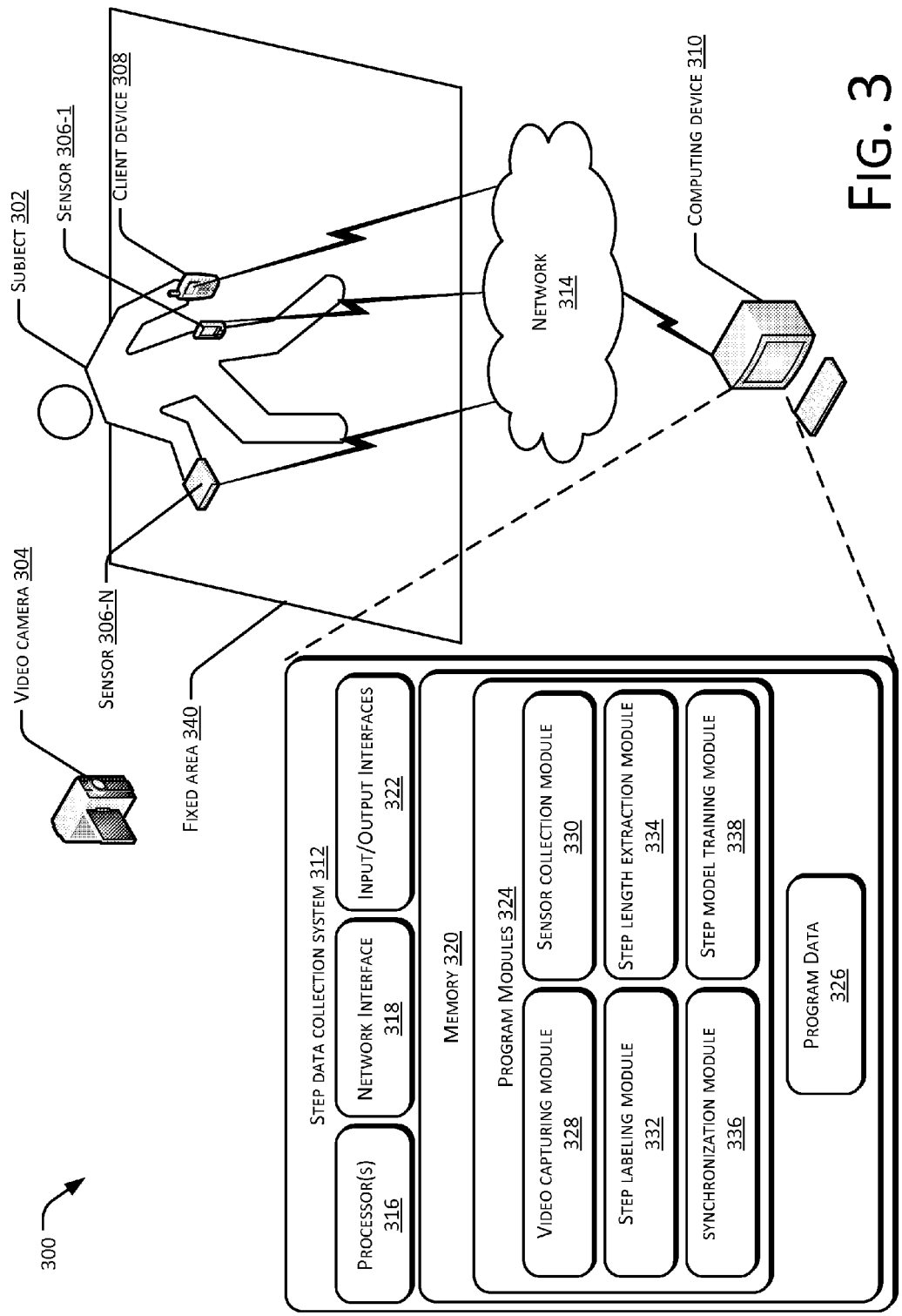
FIG. 3 illustrates an example environment including an example step data collection system.

In one embodiment, prior to using the estimation system 106 for step detection, step length estimation and/or user navigation, one or more step models that may be used in the system 106 may be created or trained in advance (e.g., prior to provision of the step length model to a user). FIG. 3 illustrates one illustrative environment 300 usable to implement a step data collection system that may be used for collecting step data and training step models. Although this step data collection system is described herein as a system that is separate from the step detection and step length estimation system 106 or the client device 104, part or all of the functions of this step data collection system may be included in the step detection and step length estimation system 106 or the client device 104, or vice versa.

In one embodiment, the environment 300 includes a subject 302, a video camera 304, one or more sensors 306-1, . . . , 306-N (collectively referred to as sensors 306), a client device 308 and a computing device 310. The computing device 310 may include a step data collection system 312. In one embodiment, the sensors 306 may communicate sensor data to the computing device 310 through a network 314 (e.g., network similar to the network 110).

The step data collection system 312 may include, but is not limited to, one or more processors 316, a network interface 318, memory 320, and an input/output interface 322. The processor(s) 316 is configured to execute instructions received from the network interface 318, received from the input/output interface 322, and/or stored in the memory 320.

The memory 320 may include computer-readable media in the form of volatile memory, such as Random Access Memory (RAM) and/or non-volatile memory, such as read only memory (ROM) or flash RAM. The memory 320 is another example of computer-readable media.

The memory 320 may include program modules 324 and program data 326. In one embodiment, the step data collection system 312 may include a video capturing module 328, a sensor collection module 330, a step labeling module 332, a step length extraction module 334, a synchronization module 336 and a step model training module 338.

In one embodiment, the video capturing module 328 may use the video camera 304 to capture a fixed area 340 where the subject 302 is instructed to walk back and forth from one side of the fixed area to the other side of the fixed area. Therefore, steps made by the subject 302 that lie in the fixed area may be recorded as a video clip, for example. Different frame rates (e.g., 30 Hz, 60 Hz, etc.) of the video camera 304 and hence video clip may be used.

During this video capturing of the steps made by the subject 302, the sensor collection module 330 may collect sensor data from the one or more sensors 306. In one embodiment, the one or more sensors may include, but are not limited to, a sensor board with three-axis accelerometer and an accelerometer included in the client device 308. The subject 302 turns on the one or more sensors 306 prior to making any step movement or entering into the fixed area 340. Additionally, prior to making any step movement or entering into the fixed area 340, the subject 302 may provide a synchronization signature that is used for synchronizing the captured video clip and the sensor data. For example, the subject 302 may shake the one or more sensors 306 and/or the client device 308 prior to making any step movement or entering into the fixed area 340 to generate a synchronization signature.

Upon capturing the video clips and collecting the sensor data from the one or more sensors 306, the step labeling module 332 may label time and position information of each step that lies in the fixed area 340. The step labeling module 332 may label the time and position information of each step automatically or with human intervention. In one embodiment, the step labeling module 332 loads the video clip and replays the video clip in a video player application (not shown) frame by frame. The step labeling module 332 may detect a video frame in which a foot of the subject 302 completely touches the ground and label a timestamp of this video frame as a start time of a step. Further, the step labeling module 332 may locate a part of the foot (such as the heel of the foot) and obtain a first pixel coordinate (Xpix1, Ypix1). The step labeling module 332 may label this first pixel coordinate as a start position of the step.

Furthermore, the step labeling module 332 may detect another video frame in which the other foot of the subject 302 completely touches the ground and label a timestamp of this another video frame as an end time of the step. Further, the step labeling module 332 may locate the same part of the other foot (i.e., the heel of the other foot, for example) and obtain a second pixel coordinate (Xpix2, Ypix2). The step labeling module 332 may label this second pixel coordinate as an end position of the step.

The step labeling module 332 may repeat the above process to obtain step information for each step the subject 302 has made within the fixed area 340. In one embodiment, the step labeling module 332 may record the step information in a list format, e.g., (start time, end time, start position in X-axis, start position in Y-axis, end position in X-axis, end position in Y-axis).

In response to labeling the step information (i.e., the time and position information) of each step, the step length extraction module 334 may map the pixel coordinates in the video frames that are obtained by the step labeling module 332 to real world coordinates. In one embodiment, the step length extraction module 334 may map the pixel coordinates to the real world coordinates using a perspective transform. The step length extraction module 334 may obtain this perspective transform through a certain number of labeled points, i.e., points with known pixel coordinates and real world coordinates. Upon obtaining the perspective transform, the step length extraction module 334 may apply this perspective transform to transform the pixel coordinates of each step into real world coordinates.

By way of example and not limitation, four points, e.g., four corners of the fixed area 340, may be labeled. Using the step labeling module 332, pixel coordinates of these four points may be obtained while respective real world coordinates may be obtained manually. The step length extraction module 334 may calculate a perspective transform based on the pixel coordinates and real world coordinates of these labeled points. For example, let (x, y) be a real world coordinate of a point and (u, v) be a pixel coordinate of that same point. Therefore, $$\begin{pmatrix} x * t_i \\ y * t_i \\ t_i \end{pmatrix} = \begin{bmatrix} a_{00} & a_{01} & a_{02} \\ a_{10} & a_{11} & a_{12} \\ a_{20} & a_{21} & 1 \end{bmatrix} * \begin{pmatrix} u \\ v \\ 1 \end{pmatrix} \quad (1)$$

Equation (1) may be rewritten as $$\begin{pmatrix} x \\ y \\ 1 \end{pmatrix} = \frac{\begin{bmatrix} a_{00} & a_{01} & a_{02} \\ a_{10} & a_{11} & a_{12} \\ a_{20} & a_{21} & 1 \end{bmatrix} * \begin{pmatrix} u \\ v \\ 1 \end{pmatrix}}{[a_{20} \quad a_{21} \quad 1] * \begin{pmatrix} u \\ v \\ 1 \end{pmatrix}} \quad (2)$$

Based on the real world coordinates and the pixel coordinates of four points (i=1, 2, 3, 4), for example, the step length extraction module 334 may estimate the above eight parameters (i.e., $a_*$) using a least square fitting method.

In response to obtaining the perspective transform (i.e., $$\begin{bmatrix} a_{00} & a_{01} & a_{02} \\ a_{10} & a_{11} & a_{12} \\ a_{20} & a_{21} & 1 \end{bmatrix}),$$

the step length extraction module 332 may obtain real world coordinates of the start and end positions of each step using the following equation:

$$x = \frac{a_{00} * u + a_{01} * v + a_{02}}{a_{20} * u + a_{21} * v + a_{22}} \quad (3)$$

$$y = \frac{a_{10} * u + a_{11} * v + a_{12}}{a_{20} * u + a_{21} * v + a_{22}}$$

Furthermore, the step length extraction module 334 may compute a step length of each step using the following equation:

$$\text{step length} = \sqrt{(x_e - x_s)^2 + (y_e - y_s)^2} \quad (4)$$

where $x_e$ is real world coordinate of an end position of a step in X-axis, $x_s$ is real world coordinate of a start position of the step in X-axis, $y_e$ is real world coordinate of an end position of the step in Y-axis, $y_s$ is real world coordinate of a start position of the step in Y-axis, In one embodiment, the step length extraction module 334 may project the above computed step length to a direction the subject 302 has been heading. For example, if the subject 302 has been instructed to walk along X-axis (in real world coordinate system), the heading direction is X-axis.

In some embodiments, in response to obtaining length information of each step and prior to associating the sensor data with each step, the synchronization module 336 is used to synchronize a time frame used by the video camera 304 or the video clip and time frame(s) used by the one or more sensors 306. The synchronization module 336 may use the synchronization signature (e.g., shaking the one or more sensors 306 and/or the client device 308 during the capture of the video clip) to synchronize these time frames. Since shaking the sensors 306 and/or the client device 308 can cause larger acceleration change compared to normal acceleration change caused by walking, for example, the synchronization module 336 may use this synchronization signature to synchronize different time frames used by the video camera 304, the one or more sensors 306, and the client device 308.

Upon obtaining the step information and the step length information of each step, the step model training module 338 may be used to train a step model for estimating a step length of a step. In one embodiment, the step model training module 338 may train a single generic step model. In another embodiment, the step model training module 338 may train a plurality of step models for a plurality of different conditions. In one embodiment, the plurality of different conditions may depend on, for example, an age, a gender, a height, a weight of a user whose step length will be estimated. Additionally or alternatively, the plurality of different conditions may depend on a type of movement of the user whose step length will be estimated. Examples of the type of movement may include, but are not limited to, walking, jogging, running, moving up and/or moving down. Additionally or alternatively, the plurality of different conditions may depend on positions of the one or more sensors 306 and/or a position of the client device 104. Examples of the positions of the one or more sensors 306 and/or the position of the client device 104 may include, but are not limited to, a position close to a body part of the user (such as fastened to or held by a hand, an arm, a waist, etc.), a pocket of the user's clothes, a bag, etc. Additionally or alternatively, the system may select the step model from the plurality of step models based on a type of shoes that the user wears. Additionally or alternatively, the system may select the step model from the plurality of step models based on a type of surface on which the user moves. Examples of the type of surface may include, but are not limited to, grass, concrete, wood, sand, etc.

By way of example and not limitation, an example step model that may be obtained by the step model training module 338 may include:

$$\text{step length} = a_1 + a_2 * f + a_3 * \Delta acc + a_4 * f^2 + a_5 * \Delta acc^2 + a_6 * \Delta acc * f \quad (5)$$

where $a_i$, i=1, 2, 3, 4, 5, 6, are coefficients determined using the training data as obtained above and using a least square fitting method. f is an estimated step frequency of a step based on sensor data and is defined as a reciprocal of a time duration for the step. $\Delta acc$ is a difference between maximal and minimal magnitudes of accelerations within that same step or that the time duration of that same step. Specifically, for each step, the step model training module 338 may obtain a list of accelerometer readings in a form of $(X_{acc}, Y_{acc}, Z_{acc})$, for example from the one or more sensors 306. Let $Mag_{acc} = \sqrt{X_{acc}^2 + Y_{acc}^2 + Z_{acc}^2}$. Therefore, $\Delta acc = Mag_{max} - Mag_{min}$, where $Mag_{max}$ is the maximal magnitude of acceleration within a step and $Mag_{min}$ is the minimal magnitude of acceleration within the same step.

Although the above step model and the step length estimation using acceleration data are given in this disclosure, the disclosed systems 106 and 312 are not limited thereto. For example, the system 106 and/or the system 312 may use a step model which is a function of a time duration of a step and a difference between maximal and minimal magnitude of acceleration within the time duration of the step. Additionally or alternatively, the system 106 and/or the system 312 may use a step model which is a function of a coupling between a step frequency (or a time duration) of a step and a difference between maximal and minimal magnitude of acceleration within the time duration of the step. Additionally or alternatively, the system 106 and/or the system 312 may use a step model which is a function of sensor data received from multiple sensors including, for example, an accelerometer, a pedometer, a digital compass and/or a gyroscope.

Exemplary Methods

Figure 4:
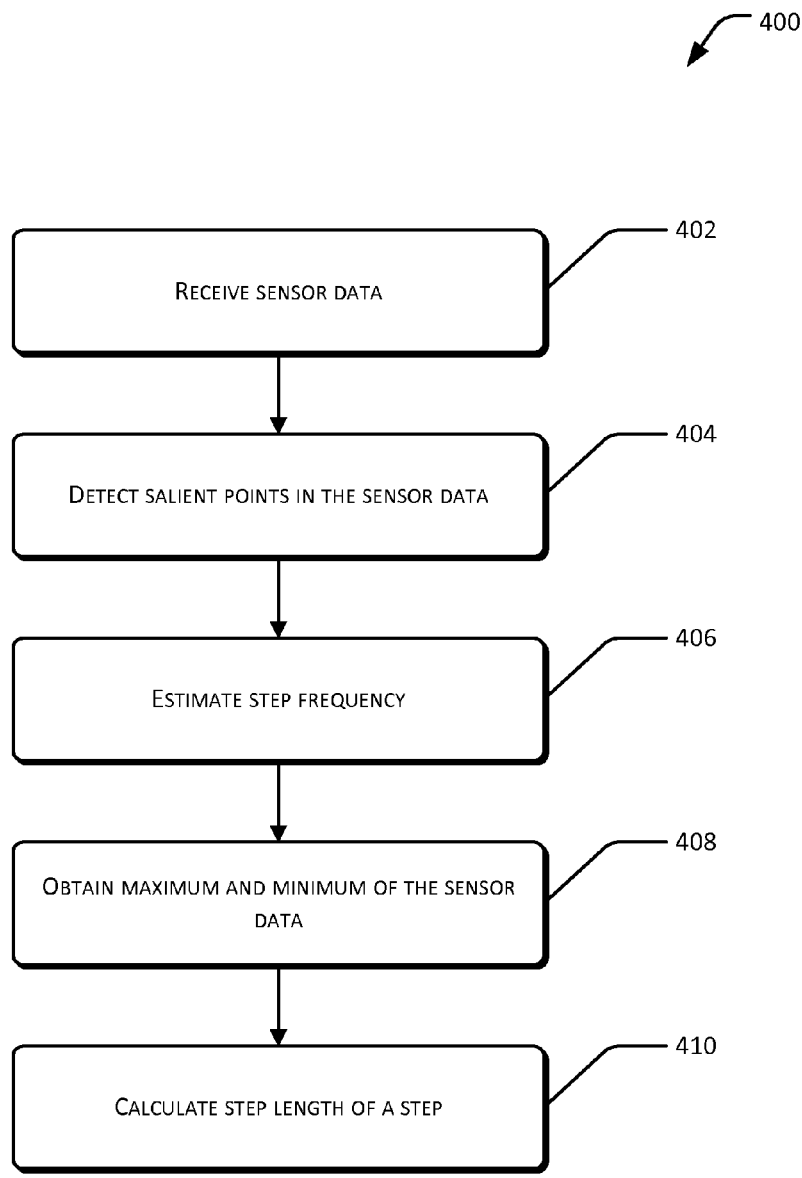
FIG. 4 illustrates an example method of step detection and step length estimation.
Figure 5:
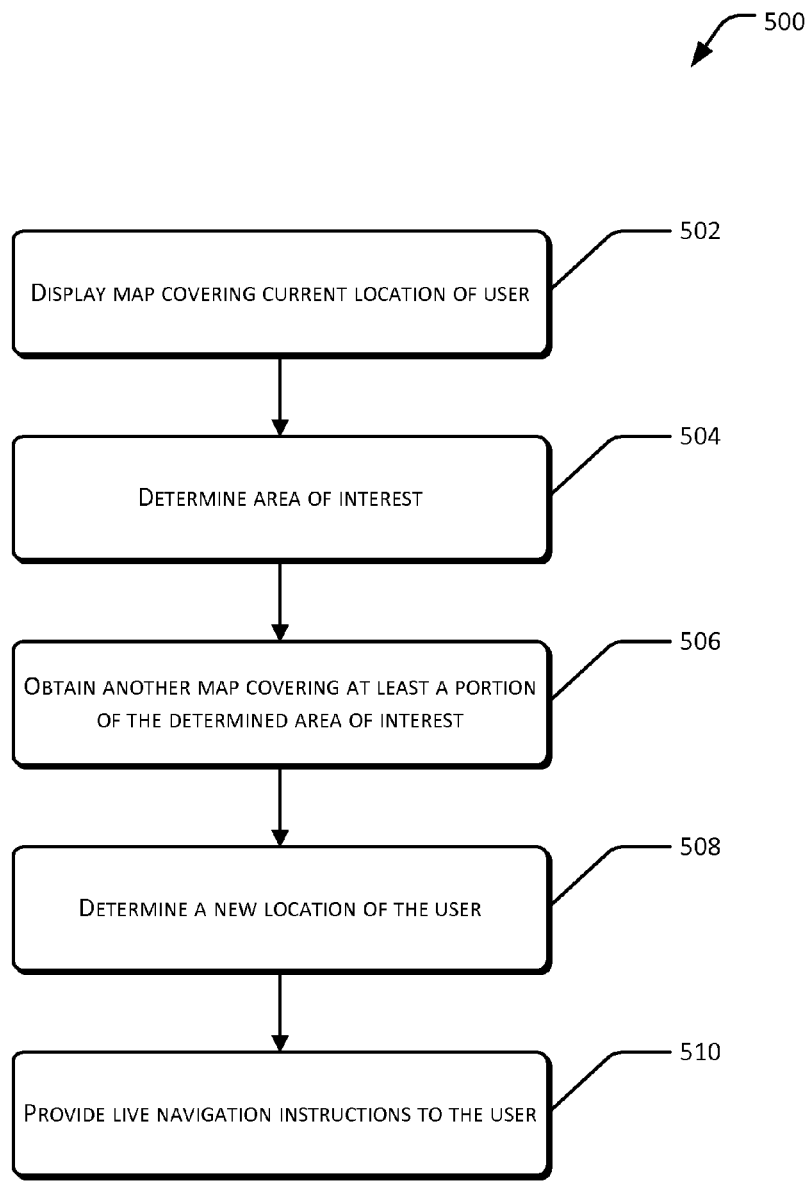
FIG. 5 illustrates an example application of the example step detection and step length estimation system described in FIG. 1 and FIG. 2.

FIG. 4 is a flow chart depicting an example method 400 of step detection and step length estimation. FIG. 5 is a flow chart depicting an example method 500 of navigating using the step detection and step length estimation system 106. The methods of FIG. 4 and FIG. 5 may, but need not, be implemented in the environment of FIG. 1 and using the system of FIG. 2. For ease of explanation, methods 400 and 500 are described with reference to FIGS. 1 and 2. However, the methods 400 and 500 may alternatively be implemented in other environments and/or using other systems.

Methods 400 and 500 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 4, at block 402, the step detection module 214 may receive sensor data from one or more sensors of the client device 104. The one or more sensors may include, but are not limited to, an accelerometer, a pedometer, a digital compass, a gyroscope, etc.

At block 404, the step detection module 214 may detect or determine salient points of a same type in the sensor data. The salient points may include, for example, valleys of a magnitude trajectory of the sensor data, zero crossing points of the magnitude trajectory, etc. Additionally, the step detection module 214 may determine that a step has been made by the user 102 based on the detected salient points in the sensor data. For example, the step detection module 214 may detect valleys of a trajectory of magnitudes of acceleration data obtained from an accelerometer.

At block 406, the step detection module 214 may estimate a step frequency based on the detected salient points in the sensor data. In one embodiment, the step detection module 214 may determine a time interval between the detected salient points in the sensor data. The step detection module 214 may then estimate the step frequency of a step based on the time interval between the detected salient points. For example, the step detection module 214 may determine a time interval between the detected valleys of the magnitude trajectory of the acceleration data.

At block 408, the step detection module 214 may optionally obtain a maximum and a minimum of the sensor data that is within the time interval between the detected salient points. For example, the step detection module 214 may obtain a maximum acceleration magnitude and a minimum acceleration magnitude within the time interval between the detected valleys of the magnitude trajectory of the acceleration data.

At block 410, the step length estimation module 216 may calculate a step length of the step based on a nonlinear combination of the estimate step frequency of the step and a linear or nonlinear function of the sensor data within the time interval between the detected salient points. Additionally or alternatively, the step length estimation module 216 may employ a step model which is a (linear or nonlinear) combination of a nonlinear function of a step frequency and a (linear or nonlinear) function of sensor data within a time interval between detected salient points to compute the step length of the step. By way of example and not limitation, the step length estimation module 216 may calculate a step length of the step based on the estimated step frequency of the step and a difference between the maximum and the minimum of the sensor data that is within the time interval between the detected salient points.

In one embodiment, the step length estimation module 216 may combine a plurality of step models to obtain a better estimation of the step length of the step. The step length estimation module 216 may linearly combine respective estimates of the step length of the step calculated from the plurality of step models with equal or different weights. In one embodiment, respective weights for the plurality of step models may depend on respective accuracies of the plurality of step models in one or more previous step length estimations. Additionally or alternatively, respective weights for the plurality of step models may be dynamically or regularly (e.g., in every 10 steps, every 10 seconds, etc.) adjusted based on respective accuracies of the plurality of step models in the one or more previous step length estimations.

Referring back to FIG. 5, at block 502, the client device 104 may display a map representing a predetermined scope of an area that covers a current location of the user 102.

At block 504, the client device 104 may determine an area of interest in which the user 102 intends to navigate. The client device 104 may determine this area of interest by, for example, determining a direction the user 102 is heading based on a digital compass of the client device 104. Additionally or alternatively, the client device 104 may receive an indication of the area of interest from the user 102. For example, the client device 104 may receive an indication of a destination location in the displayed map from the user 102.

At block 506, the client device 104 may obtain a map covering at least a portion of the area of interest or the destination location from the Internet (such as Bing maps) or one or more map stations located in a building or street close to the user 102.

At block 508, the client device 104 may determine a new location of the user on the obtained map. In one embodiment, the client device 104 may determine the new location of based on a detection of a plurality of steps the user has made and an estimation of respective step lengths of the plurality of steps through the step detection and step length estimation system 106.

At block 510, the client device 104 may provide live instructions to the user 102 to route the user 102 to the area of interest or the destination location. The client device 104 may provide these live instructions with or without using GPS data.

Although the above acts are described to be performed by either the client device 104 or the step detection and step length estimation system 106, one or more acts that are performed by the step detection and step length estimation system 106 may be performed by the client device 104 or other software or hardware of the client device 104, and vice versa. For example, the step detection and step length estimation system 106 may use the navigation module 228 to provide live navigation instructions to the client device 104 for display to the user 102.

Furthermore, the client device 104 and the step detection and step length estimation system 106 may cooperate to complete an act that is described to be performed by one of the client device 104 and the step detection and step length estimation system 106. For example, the client device 104 may analyze the sensor data to detect salient points in the sensor data and compute a step frequency. The client device 104 may further compute a difference between a maximum and a minimum of sensor data that are located within a time between the detected salient points. The step detection and step length estimation system 106 may then compute a step length of a step based on a step model using the step frequency and the sensor data (e.g., the difference computed by the client device 104).

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method of estimating a step length, comprising:
   under control of one or more processors configured with executable instructions:
   receiving sensor data from a sensor;
   detecting salient points of a same type from the sensor data;
   estimating a step frequency from the sensor data based on a time interval between the salient points of the same type in the sensor data; and
   calculating a step length of a step based at least in part on a nonlinear combination of the estimated step frequency and a predetermined function of the sensor data.

2. The method of claim 1, further comprising:
   determining a type of movement of a user that the sensor measures, the type of movement being selected from a group consisting of walking, jogging and running; and
   selecting a step model based on the determined type of movement of the user.

3. The method of claim 2, wherein selecting the step model is further based on one or more of personal information of the user, a position of the sensor, a type of shoes that the user wears or a type of surface on which the user moves, wherein the personal information of the user comprises one or more of an age of the user, a height of the user, a weight of the user or a gender of the user, and the position of the sensor comprises a position close to a body part of the user, a pocket of the user's clothes or a bag of the user.

4. The method of claim 2, wherein determining the type of movement of the user is based at least in part on the estimated step frequency and the calculated step length.

5. The method of claim 2, wherein calculating the step length comprises calculating the step length based on the selected step model.

6. The method of claim 2, further comprising:
   detecting a change in the type of movement to a new type of movement; and
   selecting a new step model based on the new type of movement.

7. The method of claim 1, further comprising filtering the sensor data using a low-pass filter prior to detecting the salient points in the sensor data.

8. The method of claim 7, wherein the low-pass filter comprises at least one of a Finite Impulse Response (FIR) filter or a Biorthogonal Spline Wavelet (BSW) filter.

9. The method of claim 1, wherein estimating the step frequency comprises:
   determining that the time interval between the detected salient points is less than a predetermined threshold; and
   in response to determining that the time interval between the detected salient points is less than the predetermined threshold, detecting a new salient point that is located outside the time interval between the detected turned points, and estimating the step frequency based on a new time interval between the new salient point and one of the detected salient points.

10. The method of claim 1, wherein estimating the frequency comprises:
    determining that the time interval between the detected salient points is greater than a predetermined threshold; and
    in response to determining that the time interval between the detected salient points is greater than the predetermined threshold, detecting a new salient point that is located within the time interval between the detected salient points, and estimating the step frequency based on a new time interval between the new salient point and one of the detected salient points.

11. The method of claim 1, further comprising:
    determining a condition associated with a first computing device that receives the sensor data from the sensor;
    performing at least one of the estimating or the calculating at the first computing device or a second computing device communicatively connected to the first computing device based on the determining.

12. The method of claim 11, wherein the condition associated with the first computing device comprises one or more of an application response latency, a power reserve, a processor speed, a CPU occupancy rate, a network bandwidth or a network speed between the first computing device and the second computing device.

13. One or more computer-readable media configured with computer-executable instructions that, when executed by one or more processors, configure the one or more processors to perform acts comprising:
    determining an area of interest in which a user intends to navigate;
    obtaining a map covering at least a portion of the determined area of interest;
    receiving sensor data from a sensor associated with the user;
    detecting salient points of a same type from the sensor data;
    estimating a step frequency from the sensor data based on a time interval between the salient points of the same type in the sensor data;
    calculating a step length of a step based at least in part on the estimated step frequency; and
    determining a location of the user on the obtained map based on a detection of a plurality of steps of the user, the estimated step frequency and the calculated step lengths of the plurality of steps.

14. The one or more computer-readable media of claim 13, further comprising providing a recommendation to the user through a computing device based on the determined location, the recommendation comprising an advertisement related to the determined location.

15. The one or more computer-readable media of claim 13, wherein the determined area of interest comprises an indoor area with little or no signal of a Global Positioning System (GPS), and determining the location of the user within the determined area of interest is performed using local sensors without using GPS data.

16. The one or more computer-readable media of claim 13, further comprising:
    receiving location information from one or more devices; and
    updating the determined location based on the received location information.

17. The one or more computer-readable media of claim 16, further comprising updating a step model that is used for the detection of the plurality of steps the user has made and the estimation of respective step lengths for the plurality of steps in response to determining that a difference between the determined location and the updated location is greater than a predetermined threshold.

18. The one or more computer-readable media of claim 13, wherein determining the location of the user comprises, for each step of the plurality of steps:
    receiving acceleration readings from an accelerometer;
    estimating a step frequency from the received acceleration readings; and calculating a step length of the respective step based at least in part on a combination of a nonlinear function of the estimated step frequency and a linear or nonlinear function of the acceleration readings.

19. A system comprising:

one or more processors;

memory, communicatively coupled to the one or more processors, storing instructions that, when executed by the one or more processors, configure the one or more processors to perform acts comprising:

displaying a map representing a predetermined scope of an area that covers a current location of a user;

receiving an indication of a destination location on the displayed map from the user; and providing live instructions to the user to route the user to the destination location without using a Global Positioning System (GPS), providing the live instructions comprising:

receiving sensor data from a sensor associated with the user;

detecting salient points of a same type from the sensor data;

estimating a step frequency from the sensor data based on a time interval between the salient points of the same type in the sensor data;

calculating a step length of a step based at least in part on the estimated step frequency; and updating a new location of the user based on a detection of a plurality of steps, the estimated step frequency of the user and the calculated step lengths of the plurality of steps made by the user.

20. The system as recited in claim 19, wherein the salient point types further comprise one of zero crossing points, valleys of a magnitude trajectory of the sensor data, or peaks of a magnitude trajectory of the sensor data.

* * * * *